United States Patent [19]

Abbondanti

[11] Patent Number: 4,672,288
[45] Date of Patent: Jun. 9, 1987

[54] TORQUE CONTROLLER FOR AN AC MOTOR DRIVE AND AC MOTOR DRIVE EMBODYING THE SAME

[75] Inventor: Alberto Abbondanti, Penn Hills Township, Allegheny County, Pa.

[73] Assignee: Westinghouse Electric Corp., Pittsburgh, Pa.

[21] Appl. No.: 745,752

[22] Filed: Jun. 18, 1985

[51] Int. Cl.$^4$ ............................................. H02P 5/40
[52] U.S. Cl. ................................... 318/803; 318/806; 318/807; 324/158 MG
[58] Field of Search ............... 318/803, 808, 800, 798, 318/806, 807; 324/158 MG

[56] References Cited

U.S. PATENT DOCUMENTS

| | | | |
|---|---|---|---|
| 4,330,741 | 5/1982 | Nagase et al. | 318/808 |
| 4,418,308 | 11/1983 | Bose | 318/803 |
| 4,456,868 | 6/1984 | Yamamura et al. | 318/800 |
| 4,484,128 | 11/1984 | Jotten et al. | 318/803 |
| 4,510,430 | 4/1985 | Ashikaga et al. | 318/808 |
| 4,567,419 | 1/1986 | Watanabe | 318/798 |

Primary Examiner—David Smith, Jr.
Attorney, Agent, or Firm—C. M. Lorin

[57] ABSTRACT

In an induction motor drive a signal representative of the torque T as derived by sensing only the stator armature current I, and the slip frequency $f_2$ and by calculating instantaneously $T = I_1^2 F$, where F is a function of $f_2/R_2$, where $R_2$ is the rotor resistance of the motor. The value of $R_2$ is adjusted to match temperature by generally two alternative methods: (1) measuring the stator temperature, relying on the change of resistance $R_1$, known experimentally, and applying an equivalent change for the rotor resistance $R_2$; (2) by running the motor at rated speed and determining experimentally $R_2/f_2$ as a function of F.

9 Claims, 11 Drawing Figures

TORQUE CONTROLLER FOR AN AC MOTOR DRIVE AND AC MOTOR DRIVE EMBODYING THE SAME

BACKGROUND OF THE INVENTION

The invention relates to induction motor drives in general, and more particularly to adjustable frequency AC motor drives requiring torque information for regulation purpose.

Certain types of drives use a torque feedback signal for closed loop regulation. This is the case in particular of traction drives.

Instead of deriving directly a torque feedback signal, methods have been devised for the derivation of torque information from operating characteristics of the induction motor.

As compared to DC drives, motor drives using induction motors present added difficulties when adequate torque sensing is required. In DC drives, a direct and accurate measure of the generated electromagnetic torque is available in a straightforward manner through sampling of the armature current. In separately excited motors, the armature current is proportional to the torque. In series-excited motors, the torque is related to the armature current by a simple quadratic law. In induction motor drives, however, the torque, although related to the stator current, involves a much more complex relationship. The torque is proportional to only part of the stator current, namely to its component in phase with the "air gap voltage", a quantity which is internal to the motor but not measurable externally, and which depends upon the terminal voltage in accordance with a complex vectorial relationship that changes with speed, load and temperature. The torque is further related to the magnetizing current, which is another component of the stator current, namely one in quadrature with the air gap voltage.

Despite the complexity of the relationship between torque and current, the problem of obtaining an accurate torque signal by processing the motor variables has been solved in the prior art. One method uses "field-oriented" or "vector" control of the motor which leads to a signal representing the motor torque and considered as versatile as the torque feedback signal derived in DC drive. That torque representative signal can be used in a feedback torque control loop acting separately on the proper component of the stator current, in a manner that has been held to render an AC motor as controllable as a DC motor in a high performance DC drive. This field-oriented control approach is described in R. Gabriel and W. Leonhard "Microprocessor Control of Induction Motor" Conference Record of IEEE 1982 International Semiconductor Power Converter Conference pp. 385–396.

The amount of signal processing necessary to implement field-oriented control of an AC motor is considerable. It is felt that for a number of medium-performance motor drives, such as in traction, for instance, where fast dynamic response to the controls is not required, the complexity of field-oriented control is not justified.

The present invention is particularly suitable for moderate performance drives, and in particular where simplicity of control of induction motor is the primary goal, even if it is at the cost of some loss of performance in terms of speed of response. More specifically, the object of the present invention is to obtain through simple means, a feedback signal representing the torque generated by the motor, without being concerned with what particular use will be made of such signal. The invention is primarily concerned with sensing of the torque. The invention is also directed to control using such torque representative signal.

SUMMARY OF THE INVENTION

The present invention resides in the derivation of torque information from the motor terminal signals derived directly and from a speed representative signal, with the assistance of the microcomputer run with a specially conceived algorithm. The algorithm uses a torque T relation involving the stator current $I_1$, and the slip angular frequency $\omega_2$, which are sensed in the system, as follows:

$$T = 3pI_1^2(R_2/\omega_2) \frac{(R_2/\omega_2)^2 + L_2^2}{[(R_2/\omega_2)^2/L_M + L_2(1 + L_2/L_M)]^2 + (R_2/\omega_2)^2}$$

where
p is the number of pairs of poles,
$R_2$ the rotor resistance,
$L_2$ the rotor leakage inductance, and
$L_M$ the magnetizing inductance of the motor.

In accordance with another aspect of the invention, the stator temperature is measured and the rotor temperature is determined therefrom in accordance with a linear relationship. This approach leads to thermal drift compensation for the rotor.

The thermal drift compensation approach is illustrated by two alternate relations:

$$\Delta R_2/R_2(c) = \Delta R_1/R_1(c)$$

and $$\Delta R_2/R_2(c) = k[\Delta R_1/R_1(c)][R_2(c)/R_1(c)]$$

(depending upon whether the motor is totally enclosed or drip proof), where k is $<1$, $R_1$ is the stator resistance, $R_2$ the motor resistance, $\Delta R_1$ the thermal drift in the stator resistance, $\Delta R_2$ the thermal drift in the rotor resistance, and $R_1(c)$, $R_2(c)$ are reference values of $R_1$ and $R_2$ for a specific temperature.

DESCRIPTION OF THE PREFERRED EMBODIMENTS

As stated earlier, in AC motor drives torque sensing is not straightforward as with a DC motor drive because the torque is not related univocally to the stator current and it calls for a complex vectorial relationship involving parameters which can be measured, like the air gap voltage or the magnetizing current. In addition such relationship is affected by changes in speed, load and temperature.

Nevertheless, the prior art has provided an accurate torque signal a the cost of a substantial complexity in its derivation.

In this regard, it is observed that the prior art approaches can be classified in three categories. A first approach consists in taking the torque as a function of the rotor current, the air-gap flux and the rotor phase angle. See for instance: "Thyristor Control of AC Motors" by J. M. D. Murphy page 8, edited by Pergamon Press Ltd. Oxford (GB) 193. Another approach uses a function of rotor current, slip and stator frequency. See for instance "Power Electronics" by R. S. Ramshaw, page 109, edited by Chapman & Hall Ltd. (GB) 1973. A third approach is distinguishable in that the torque is seen as a function of the air-gap flux and the slip-frequency. It is observed that in those three instances at least one of the parameters involved is internal to the motor, that is, one that cannot be directly measured at the terminals or on the shaft.

The present invention is based on the derivation of the torque in accordance with a relationship involving solely the stator current $I_1$ and the slip frequency $\omega_2$, which are parameters both measurable directly.

Figure 1:
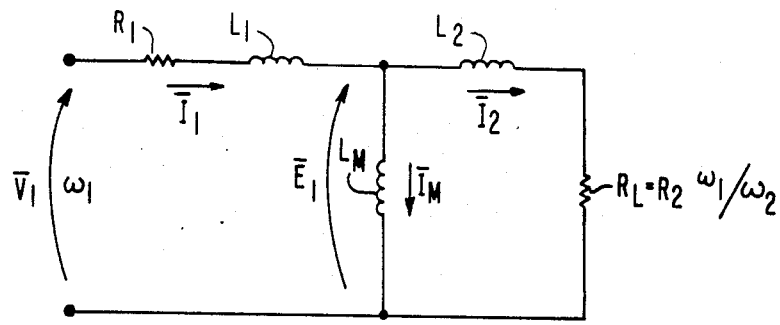
FIG. 1 is the equivalent circuit of an induction motor operating in the steady state condition.

Referring to FIG. 1 the diagram of the equivalent circuit of an induction motor is shown for the motor in a steady state. $V_1$ is the stator voltage, $\omega_1$ the input frequency for the stator, $I_1$ the stator current, $R_1$ the stator resistance, $L_1$ the stator leakage inductance, $L_M$ the magnetizing inductance, $L_2$ the rotor leakage inductance, $R_2$ the rotor resistance, $R_L$ represents the load and is equal to $R_L = R_2 \cdot \omega_1/\omega_2$, $I_M$ is the magnetizing current and $E_1$ the air gap voltage.

Since the air gap power equals the mechanical output power less the rotor losses (principle of power conservation), it follows:

Air gap power $= I_2^2 R_2 \omega_1/\omega_2$

Mechanical power (per phase) $= T \times \text{Speed}/3 = T(\omega_1 - \omega_2)/(3p)$ Rotor losses $= I_2^2 R_2$, which leads to:

$I_2^2 R_2 \omega_1/\omega_2 = T(\omega_1 - \omega_2)/(3p) + I_2^2 R_2$

Then:

$$T = 3p I_2^2 R_2/\omega_2 \qquad (1)$$

The rotor mesh of FIG. 1 leads to:

$$\bar{I}_2 = \bar{E}_1/(R_2\omega_1/\omega_2 + j\omega_1 L_2) = \bar{E}_1(R_2/\omega_2 - jL_2)/(\omega_1 D)$$
$$\text{if } D = (R_2/\omega_2)^2 + L_2^2 \qquad (2)$$

Accordingly, $$I_2^2 = E_1^2/\omega_1^2)[(R_2/\omega_2)^2 + L_2^2]/D^2 = (E_1/\omega_1)^2/D \qquad (3)$$

Figure 2A:
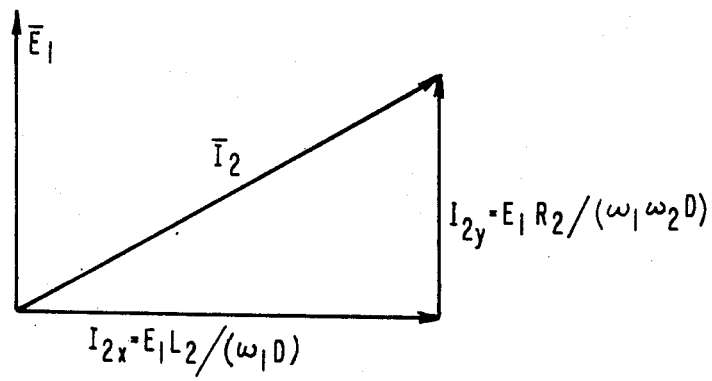
FIGS. 2A and 2B are phasor diagrams relating the motor current components to the air gap voltage (FIG. 2A) and to each other (FIG. 2B)
Figure 2B:
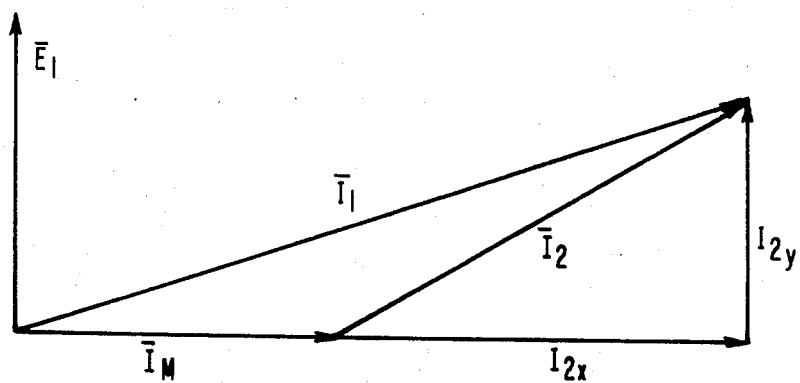

Equation (2) expressed that the vector $I_2$ has two components, $I_{2y}$ in phase with vector $E_1$ and $I_{2x}$ in quadrature with $E_1$, where:

$$I_{2y} = E_1 R_2/(\omega_1 \omega_2 D) \qquad (4)$$

and $$I_{2x} = E_1 L_2/(\omega_1 D) \qquad (5)$$

in accordance with the $I_2$ vector diagram of FIG. 2A, which relates $I_2$ to the air gap voltage $E_1$. FIG. 2B is a phasor diagram relating the motor currents, $\bar{I}_1$ for the stator and $\bar{I}_2$ for the rotor, to the air gap voltage $E_1$. From FIG. 2B, it appears that $\bar{I}_1$ is the sum of $\bar{I}_M$, the magnetizing current vector, and $\bar{I}_2$. Therefore, $$I_1^2 = (I_M + I_{2x})^2 + (I_{2y})^2 \qquad (6)$$

Since $I_M = E_1/(\omega_1 L_M)$ and $I_{2x}$ and $I_{2y}$ are given by (4) and (5), equation (6) leads to:

$$\begin{aligned}
I_1^2 &= (E_1/\omega_1)^2(1/L_M + L_2/D)^2 + [R_2/(\omega_2 D)]^2 \qquad (7)\\
&= [E_1/(\omega_1 D)]^2[(D + L_2 L_M)/L_M]^2 + (R_2/\omega_2)^2\\
&= [E_1/(\omega_1 D)]^2 G
\end{aligned}$$

with $G = [(R_2/\omega_2)^2/L_M + L_2(1 + L_2/L_M)]^2 + (R_2/\omega_2)^2$

From (3) and (7) it follows that:

$$I_1^2 = I_2^2 G/D$$

and $$I_2^2 = I_1^2 D/G \qquad (8)$$

Equation (8) is combined with equation (1), with the result:

$$T = 3p I_1^2 (R_2/\omega_2) D/G \qquad (9)$$

If we replace D and G, as given by equations (2) and (3) for D, and by equation (7) and (G), equation (9) becomes:

$$T = \qquad (10)$$
$$3p I_1^2 (R_2/\omega_2) \; \frac{(R_2/\omega_2)^2 + L_2^2}{[(R_2/\omega_2)^2/L_M + L_2(1 + L_2/L_M)]^2 + (R_2/\omega_2)^2}$$

where, p represents the number of pairs of poles, and all units are expressed in the MKS system. Illustratively, the parameters of equation (10) are given by the following TABLE I.

TABLE I

| | |
|---|---|
| Rated Power | 190 hp |
| Number of Poles: | 4 (p = 2) |
| Rated Stator Voltage: | 420 V (rms, line-line) |
| Rated Stator Current: | 258.1 A (rms) |
| Base Frequency | 45 Hz |

TABLE I-continued

| | |
|---|---|
| Rated Slip Frequency | 0.526 Hz |
| Stator Leakage Inductance: | $L_1$ 3.244 × 10$^{-4}$ H |
| Stator Resistance: | $R_1 = 2.404 × 10^{-2}$ Ohms |
| Magnetizing Inductance: | $L_M = 7.653 × 10^{-3}$ H |
| Rotor Leakage Inductance: | $L_2 = 5.960 × 10^{-4}$ H |
| Rotor Resistance: | $R_2 = 1.171 × 10^{-2}$ Ohms |

Figure 3:
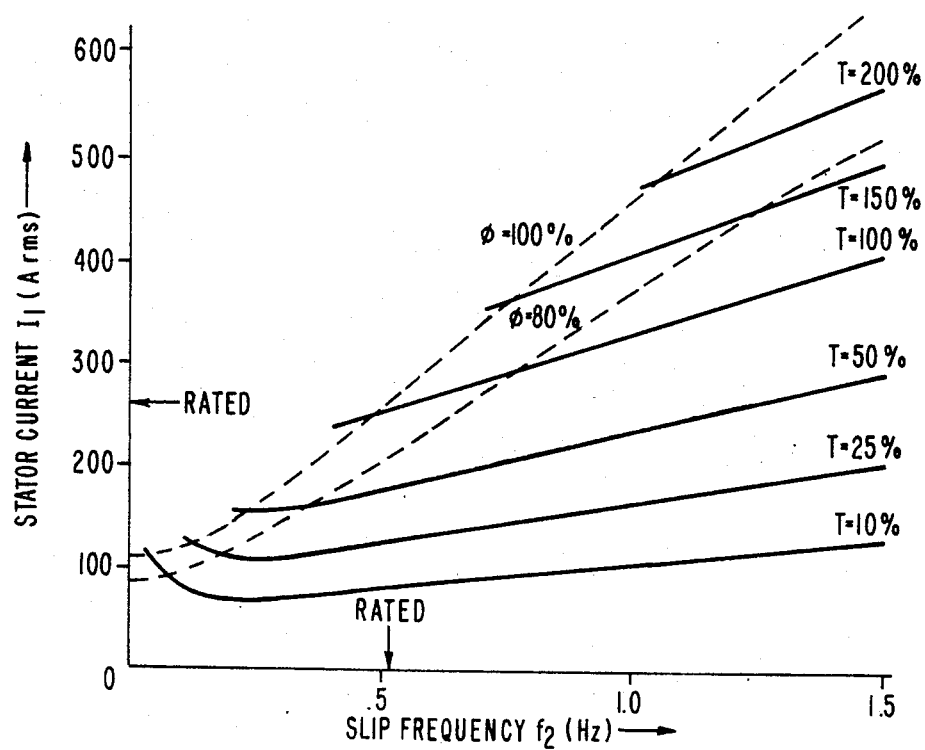
FIG. 3 is a family of curves expressing for a specific motor the values of the torque and function of the slip frequency and the stator current.

This table illustrates a particular traction motor. With the characteristics there stated, equation (10) can be represented by a family of curves as shown by FIG. 3. In FIG. 3, the stator current I, in ampere/rms is shown along the ordinate axis. It belongs to a series of curves such as (C$_1$) for T=10%, (C$_2$) for T=25%, (C$_3$) for T=50%, (C$_4$) for T=100%, (C$_5$) for T=150° and (C$_6$) for T=200%, each corresponding to a rated value of the torque (in %). These curves represent the stator current as a function of the slip frequency f$_2$(Hz), and as a rated value. Curves shown in dotted line which are transverse to the family of curves (C$_1$)-(C$_6$) represent the flux $\phi$, which at 100% is the limit to the left for each of the curves (C$_1$)-(C$_6$). One additional dotted line curve is shown for 80% of $\phi$, to show the increased level of the stator current I$_1$ required to achieve the same torque T.

It appears that, when reading a sensed value of slip frequency f$_2$ (a value readily available in many applications, such as traction motor drives, for instance by speed measurement and differentiation from the applied stator frequency f$_1$) and while reading the value of the stator current I$_1$ (by motor current sensing, for instance, or by current DC link current sampling as explained in U.S. Pat. No. 4,520,298 issued May 28, 1985), a point is defined in the plane of FIG. 3 which belongs to a uniquely identified curve (C) representing the operating torque level, independently from any knowledge whatsoever of the values of the frequency, voltage, the flux level, the power factor, the speed, the rotor current, the rotor angle, etc. . . . as would be needed with any approach of the prior art.

In addition, to each point in the plane of FIG. 3, corresponds not only a unique value of the torque T, but also a unique value of the flux $\phi$, the latter as shown in dotted lines. Thus, all the points on the curve $\phi$=100% represent operation at rated flux. Any points on a curve of higher flux level ($\phi$>100%), since they are above rated value, will normally correspond to motor saturation. The equivalent circuit of the diagram of FIG. 1 is not valid under such condition. Therefore, equation (10) does not apply to such situation and no points need to be considered beyond line $\phi$=100%, that is, to the left of the curves of FIG. 3.

From the preceding, it appears that a torque estimation method according to the present invention can be based on a family of curves (C) like shown in FIG. 3.

Expressed in terms of digital treatment, a word representing the digital value of f$_2$ will be combined with a word representing the digital value of I$_1$ so as to form a particular address. After the values of the torque have been stored in accordance with a "look-up" table representing all the torque values, such as like on FIG. 2, in relation to the respective addresses, any address derived from the sensed digital values of f$_2$ and I$_1$ will provide with such pre-programmed look-up table the value of the torque T.

It is acknowledged that torque determination with this approach is based on the steady-state condition of an induction motor, as stated earlier when referring to the equivalent circuit of FIG. 1. Accordingly, torque information derived with this approach during transients lasting less than one period of the stator current would be inaccurate. Nevertheless, the method according to the invention will be applicable to motor drives which perform satisfactorily at medium rather than high performance.

In accordance with another embodiment of the invention, equation (10) is modified so as to lead to a further practical implementation. Equation (10) is rewritten as:

$$T = I_1^2 F \qquad (11)$$

with F representing a function of the ratio f$_2$/R$_2$ which is a characteristic of the motor. This leads to:

$$F = f(f_2/R_2) = \qquad (12)$$

$$3p(R_2/\omega_2) \frac{(R_2/\omega_2)^2 + L_2^2}{[(R_2/\omega_2)^2/L_M + L_2(1 + L_2/L_M)]^2 + (R_2/\omega_2)^2}$$

Figure 4:
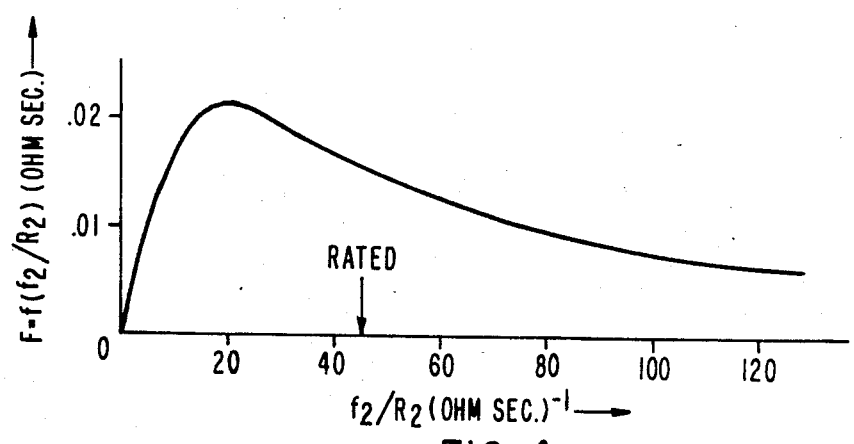
FIG. 4 is a curve characterizing the function F of the slip frequency in a specific motor situation, like in FIG. 3.

As with equation (10), equation (11) leads to a response curve based on the characteristics of the motor of Table I shown by FIG. 4, in which F is a function of f$_2$/R$_2$.

The curve of FIG. 3 is valid for slip frequency values in the range from zero to 300% of the rated value, when in the motoring quadrant. For the regenerating quadrant a curve (not shown) can be drawn for negative slip frequency and negative F values. Therefore, the latter is a curve which is the symmetrical of the curve of FIG. 3 in relation to the origin O. As earlier stated, the values of F, as a function of f$_2$/R$_2$, will be stored in a look-up table. The digitized value of f$_2$/R$_2$ as derived during motor drive operation will be used as an address to such look-up table. Knowing F1, the derivation of T can be implemented with a multiplication function, since I$_1^2$ is a factor in equation (11). It is noted that a number of memory locations of the order of 2$^8$, typically, are adequate to provide all the points of the curve of FIG. 4.

Figure 5:
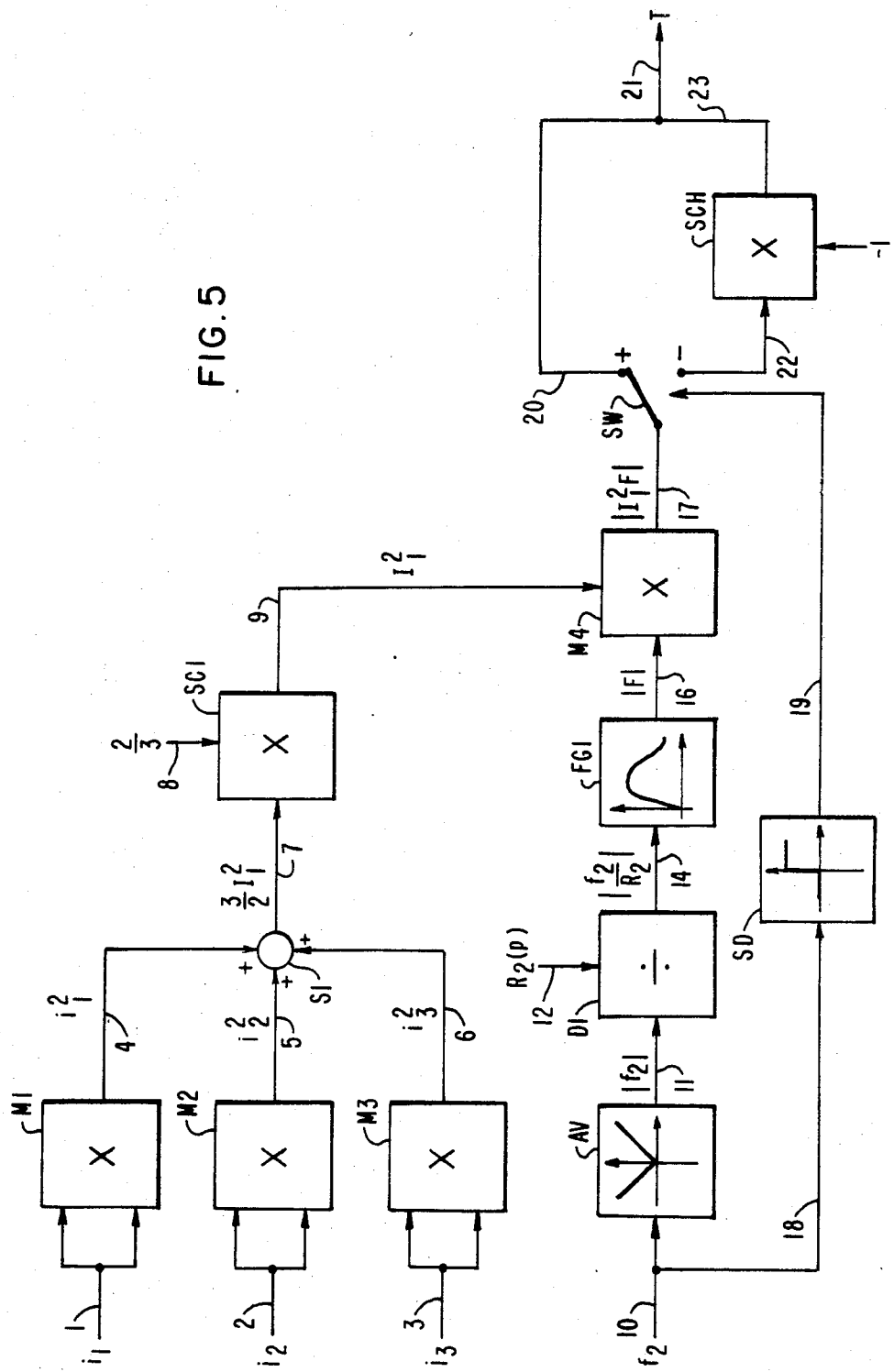
FIG. 5 is a block diagram illustrating the implementation of the torque estimation method according to the invention.

Referring now to FIG. 5, a block diagram illustrates the implementation of the torque estimation method according to the embodiment of FIG. 4. The three instantaneous stator currents i$_1$, i$_2$, i$_3$ are sensed and derived in digital form on lines 1, 2, 3 respectively. Multipliers M1, M2, M3 provide corresponding square values i$_1^2$, i$_2^2$, i$_3^2$ on respective lines 4, 5, 6. Summer S1 provides the average value 3/2 I$_1^2$, on line 7. Scaler SC1, responsive to line 7 and to coefficient ⅔ on line 8 provides on line 9 the value I$_1^2$. On line 10 the digitized value of the slip frequency f$_2$ is derived, then passed through an absolute value function generator AV. The absolute value |f$_2$| so derived on line 11 is applied to a divider D1 having on line 12 the digital value R$_2$(p), which is the rotor resistance of the motor, as a divisor. Therefore, at the output on line 14 is derived |f$_2$/R$_2$|, which is the variable in function F of equation (11).

Function generator FG1 responds to the value of line 15 to provide on line 16 the value |F|. Multiplier M4 responds o signal I$_1^2$ of line 9 and to signal |F| of line 16 to provide on line 17 the value |I$_1^2$F| which is the torque T. As to the sign thereof, it is provided from lines 10 and 18 and sign detector SD onto line 19. When the sign of line 19 is a ONE, a switch SW is controlled to be positioned as shown, so that line 17 goes by line 20 to line 21 as a positive T output. When sign detector SD indicates on line 14 a zero, switch SW is positioned so that the signal of line 17 goes by line 22 onto a sign changer SCH. The output line 23 thereof and line 21 as thereby providing a negative output T.

It is observed that the three instantaneous currents $i_1$, $i_2$, $i_3$ of lines 1, 2, 3 represent, for instance, simultaneous samplings of the fundamental stator currents according to equations:

$$i_1 = I_1 \sin \omega_1 t$$

$$i_2 = I_1 \sin (\omega_1 t - 120°)$$

$$i_3 = I_1 \sin (\omega_1 t - 240°)$$

Figure 6:
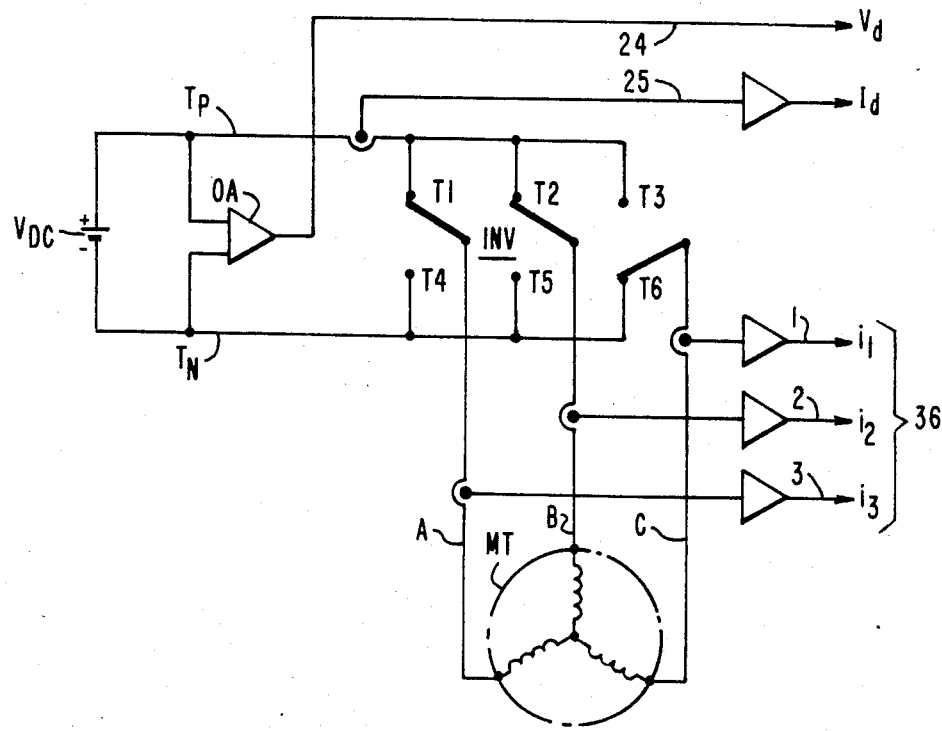
FIG. 6 illustrates a PWM drive circuit and FIG. 7 is a control diagram as can be used according to the invention in conjunction with the circuitry of FIG. 5.

These values may be obtained as shown in FIG. 6. FIG. 6 shows a conventional pulse-width-modulated motor drive. The DC link is schematized by voltage source $V_{DC}$ and DC terminals $T_P$, $T_N$. Six thyristors T1–T6 belonging to an inverter are illustrated by three pairs of contacts and three two-position switches therebetween, respectively. The pivotal arms are connected via respective phase lines A, B, C to the respective windings of the motor MT. As shown illustratively on FIG. 6, T1 and T2 are conducting on the positive side and T6 is conducting on the negative side thereof. Currents $i_1$, $i_2$, $i_3$ are derived by sensing the AC currents in the three phase A, B, C, which are, then, inputted by lines 1, 2, 3 into the torque estimation circuit of FIG. 5. Signal $f_2$ of line 10 is also inputted into the torque estimation circuit of FIG. 5.

From the DC link of FIG. 6 are derived on line 24 a signal representative of the DC voltage $V_d$ existing between terminals TP, TN, and on line 25 a signal representative of the DC link current $I_d$. Instead of deriving $i_1$, $i_2$, $i_3$ as shown in FIG. 6, it is possible to use DC link current sampling, with pole conduction states correlation, as explained in earlier-mentioned U.S. Pat. No. 4,520,298.

Figure 7:
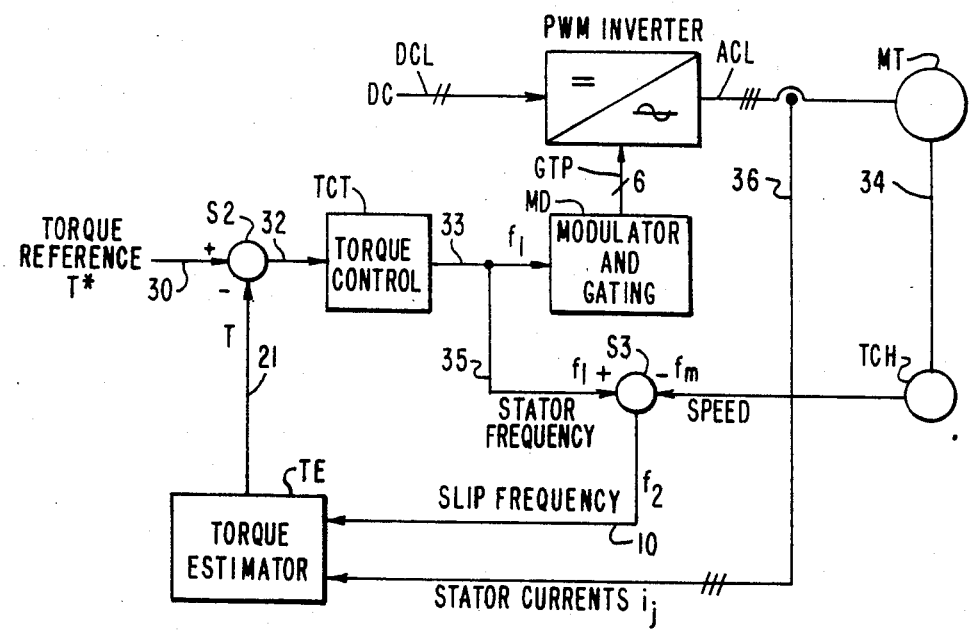
Figure 8:
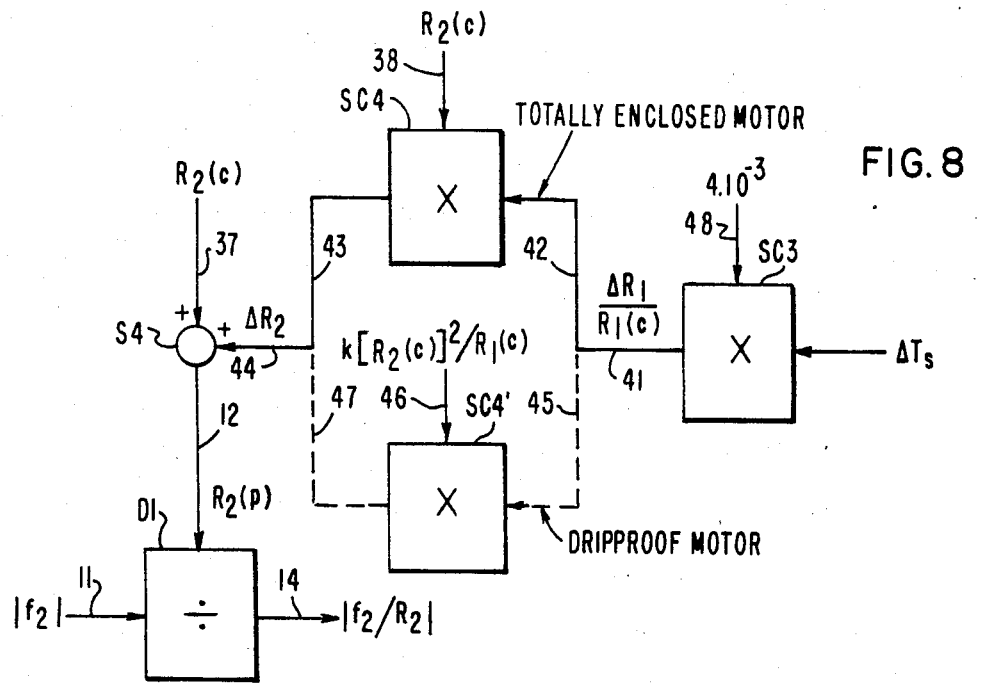
FIG. 8 illustrates with a block diagram the implementation of thermal drift compensation.

Referring to FIG. 7, the torque estimator circuit TE of FIG. 5 is shown inserted in a conventional PWM motor drive for the purpose of illustrating torque regulation according to the invention. The DC link DCL is inputted in a PWM inverter INV outputting AC current on AC lines ACL to the stator of motor MT. The inverter is controlled by gating pulses on lines GTP derived from a modulator and gating circuit MD, as generally known. Modulator MD is responsive to the applied frequency control signal $f_1$ on line 33, which itself is determined by a torque controller TCT. The torque controller is responsive to a torque reference signal on line 30 and to the torque feedback signal derived on line 21 from the torque estimator circuit TE, typically like shown in FIG. 5.

From a tachometer TCH is derived the speed signal on line 34. When compared by summer $S_3$ to the frequency signal $f_1$ (from lines 33 and 35), the speed signal $f_m$ leads to the slip frequency $f_2$, of line 10. On line 36 the stator currents $i_1$, $i_2$, $i_3$ are applied to the torque estimator circuit TE together with the signal of line 10. Thus, the torque controller TCT processes the torque error of line 32 after summer S2 and generates, on output line 33, a frequency signal $f_1$ which commands the inverter fundamental output frequency via the modulator circuit MD, source of the logic signals controlling the gating sequence of the power switches ($T_1$–$T_6$ in FIG. 6). It is understood that other torque regulator schemes other than the one of FIG. 7 can embody the torque estimator circuit according to the present invention.

The prior art methods of deriving torque with an algorithm based on the equivalent circuit of an induction motor, carry with them errors due to change of the rotor resistance with temperature. The present invention includes a practical solution to overcome this inaccuracy. The variations in the value of rotor resistance $R_2$ which are due to rotor temperature rise as the motor heats up under load, typically, are in the order of 0.4% per degree Celsius of temperature change in copper or aluminum rotor cages. If $R_2(c)$ represents the value of the rotor resistance when cold (at 25° C. typically), the actual value of $R_2$ when the motor heats up will drift to $$R_2(a) = R_2(c) + \Delta R_2,$$

The variation of resistance $\Delta R_2$ is generally unknown. Referring to FIG. 4, the unknown variation $\Delta R_2$ appears in the signal of line 12 which is the divisor term applied to divider D1. The signal of line 12 is $R_2(p)$ such that $$R_2(p) = R_2(c) + \Delta R_{2'},$$

whereby $\Delta R_2$ is causing an error introduced in the estimation of the torque, when using line 14 into FG1, and function F on line 16.

In order to assess the magnitude of the error, data derived from routine temperature tests conducted in a typical manufacturing plant were taken into consideration in order to determine relative errors $\Delta f_2/f_2$ (cold) and $\Delta R_2/R_2$ (cold). Thus, a particular motor is run for hours from the 60 Hz main power supply at rated voltage and at a constant torque load close to the rated load. The temperatures in various parts of the stator and the frame of the motor are measured during the run. Indeed, rotor temperatures cannot be measured. A table of data so established is illustrated by the following Table II.

TABLE II

| | | Motor Data | | | | Test Data | | | | | | Slip Frequency $f_2$ (Hz) | | Derived Data | | | |
|---|---|---|---|---|---|---|---|---|---|---|---|---|---|---|---|---|---|
| | | | | | | Stator Resistance $R_1$ (Ohms) | | Speed (rpm) | | | | | | | $\frac{\Delta R_2}{R_2 \text{(cold)}}$ | | |
| Case No. (a) | L Spec (b) | Rating (hp) (c) | Nr of poles (d) | Type of Enclosure (e) | $\frac{R_2}{R_1}$ (f) | Cold Value (g) | Hot Value (h) | Cold Value (i) | Hot Value (j) | $\frac{\Delta R_1}{R_1 \text{(cold)}}$ (k) | Cold Value (l) | Hot Value (m) | $\frac{\Delta f_2}{f_2 \text{(cold)}}$ (n) | Inferred from Speed Drift (o) | Predicted from Equations (7) (p) | Prediction Error [in % of column (o)] (q) | Possible Measurement Error [in % of colum (o)] (r) |
| 1 | 832414 | 50 | 4 | Drip-proof | .778 | .1489 | .1763 | 1776 | 1773 | .184 | .80 | .90 | .125 | .125 | .122 | 2 | 34 |
| 2 | 870710 | 75 | 4 | Drip-proof | .433 | .1396 | .1741 | 1779 | 1777 | .247 | .70 | .77 | .095 | .095 | .091 | 4 | 52 |
| 3 | 938754 | 100 | 4 | Drip-proof | .503 | .1104 | .1374 | 1778 | 1776 | .244 | .73 | .80 | .091 | .091 | .104 | 7 | 51 |
| 4 | 938541 | 100 | 6 | Drip-proof | .756 | .0753 | .0957 | 1184 | 1181 | .222 | .80 | .95 | .187 | .187 | .142 | 23 | 35 |
| 5 | 962660 | 100 | 6 | Totally Enclosed Fan Cooled | .849 | .0718 | .0891 | 1186 | 1182 | .241 | .70 | .90 | .286 | .286 | .241 | 16 | 28 |
| 6 | 986727 | 150 | 4 | Drip-proof | .973 | .0469 | .0571 | 1774 | 1769 | .217 | .87 | 1.03 | .192 | .192 | .179 | 7 | 21 |
| 7 | 963195 | 150 | 4 | Totally Enclosed Fan Cooled | .860 | .0283 | .0369 | 1789 | 1785 | .304 | .37 | .47 | .273 | .273 | .304 | 11 | 40 |
| 8 | 881837 | 200 | 4 | Drip-proof | 1.039 | .0225 | .0288 | 1777 | 1772 | .282 | .77 | .93 | .217 | .217 | .249 | 15 | 23 |
| 9 | 918997 | 200 | 4 | Drip-proof | .715 | .0351 | .0437 | 1781 | 1778 | .245 | .63 | .73 | .158 | .158 | .149 | 6 | 35 |

As illustrated in Table II, two sets of data are collected during the temperature runs, namely the values of the stator resistance $R_1$ and the motor speed $f_m$. More specifically, column (g) is $R_1$ (cold); column (h) is $R_1$ (hot); column (i) is $f_m$ (cold) and column (j) is $f_m$ (hot). Table II contains nine rows corresponding to seven different motors (column (b)) of particular rating (column (c)), number of poles (column (d)), of the type "drip-proof" or "totally enclosed fan cooled" (column (e)), of ratio $R_1/R_2$ (column (f)). It appears that during the run with increased temperature, the motor slows down slightly, as reflected by an increase of slip due to temperature. This increase in slip frequency $\Delta f_2$ in per unit of the initial slip frequency $f_2$ (cold) matches the per unit increase of rotor resistance $\Delta R_2$ in relation to the value of $R_2$ at room temperature $R_2$ (cold), typically for 25° C. Adopting the value of $\Delta f_2/f_2$ (cold) of column (n) as the value $\Delta R_2/R_2$ (cold) under the aforementioned assumption, column (o) contains data representing $\Delta R_2/R_2$ (cold), as inferred from the speed drift $\Delta f_2$. This drift varies from about 9% to about 29% among the nine rows of Table II. Assuming such a discrepancy in the value of $R_2(p)$, the resulting error in the torque estimation will depend upon the slope of the curve of FIG. 4. With the motor of Table I, and the curve of FIG. 4, the error on the torque value would be in a range from 6% to 14% when operating at rated slip, and from 8% to 21% when at twice the rated slip. These levels are substantial. It is proposed, according to the present invention to provide thermal drift compensation, thereby to correct for temperature-related errors in the torque estimation method illustrated by FIG. 5.

According to the invention, a first approach is used for compensating the effects of thermal drift of $R_2$ based on stator temperature measurements. The variations of stator temperature with respect to the reference temperature of 25° C. (273° K.) can easily be measured with a probe embedded in the stator winding. It is customary to wire to external equipment a Resistance Temperature Detector (RTD) device placed inside the winding in order to measure the stator temperature for test purposes. If $\Delta T_s$ is the rise of the stator temperature above 25° C., the thermal drift $\Delta R_1$ in stator resistance from the 25° C. value $R_1(c)$ is given by:

$$\Delta R_1/R_1(c) = 0.004 \, \Delta T_s \quad (13)$$

Thus, the drift in stator resistance is known at any instant by stator temperature measurements.

To compensate for rotor resistance drift, the assumption is made that the rotor temperature is related to the stator temperature via a simple linear law. In totally enclosed fan cooled motors, it can be assumed that there is a tight thermal coupling between rotor and stator, thus, that the rotor resistance thermal drift relative to the cold value is the same as the stator resistance drift. In drip-proof motors, the tight thermal coupling hypothesis does not apply. It is accepted that the rotor temperature can be different from the temperature of the stator. However, the variation on the rotor is related to the variation on the stator via a simple rule, for instance, the heat generated in the rotor relates to the stator heat proportionally to the ratio between the two resistances.

Thus, one possible correlation between rotor resistance drift and stator resistance drift could be as follows:

$$\Delta R_2/R_2(c) = \Delta R_1/R_1(c), \quad (14)$$

for the totally enclosed motor, or $$\Delta R_2/R_2(c) = k[\Delta R_1/R_1(c)][R_2(c)/R_1(c)], \quad (15)$$

for the drip-proof motor. The coefficient k of equation (15) is less than unity and reflects better cooling conditions in the rotor due to blower vanes on the rotor.

Using k=0.85 in equation (5), the two equations (14) and (15) have been applied to the nine cases of Table II, resulting in column (p) of Table II listing the predicted values of rotor resistance thermal drift based on the known stator resistance drift given in column (k). The predicted values are to be compared to the values listed in column (o), which are inferred from a change in slip frequency $\Delta f_2$ during the run. The difference between columns (p) and (o) could be viewed as representing the inaccuracy of the prediction procedure. It is given in relative value in column (q). It appears that this error is reasonably small (10% in average) indicating the effectiveness of the proposed prediction approach. In assessing the predicted error, however, it should be kept in mind that there exists a rather large error affecting the determination of the rotor resistance drift in column (o) when inferred from slip values, so that the data in column (o) cannot be treated as a reference. Since the speed is given with a resolution of 1 rpm, there is an incertitude of ±0.5 rpm in the slip speed, which results in an incertitude in the values of column (o) attaining the levels given in % in column (r). The prediction procedure is to be considered accurate as long as it results in errors in column (q) not exceeding the incertitude errors in column (r).

Accordingly, thermal drift compensation is achieved, in accordance with the invention, by using equations (12), (13), (14) and (15). The implementation will be as shown in FIG. 7.

The value $\Delta T_s$ of equation (13) is applied digitally to a scaler SC3 which receives by line 48 the scaling factor $4.10^{-3}$, so that on line 41 scaler SC3 provides a signal representative of $\Delta R_1/R_1(c)$, in accordance with equation (13).

Thereafter, the situation depends upon whether equation (14) is used (totally enclosed rotor), or equation (15) (drip-proof motor). In the first instance, the signal of line 41 goes by line 42 to a scaler SC4 which receives by line 38 the scaling factor $R_2(c)$. in the second instance, line 41 goes to line 45 (in dotted line) and a scaler SC4' which is controlled by a scaling factor on line 46 representing $k[R_2(c)]^2/R_1(c)$. Typically, k=0.85. The outputted signals on line 43 from SC4, or of line 47 from SC4', go to line 44 as one input of a summer S4 responsive to the input $R_2(c)$ of line 37. As a result, summer S4 provides on line 12 the correct value $R_2(p)$ used as input to divider D1 of FIG. 5.

According to the invention, a second approach for thermal drift compensation is used which is applicable whenever sensing of the stator temperature is considered impractical, or inaccurate. This approach is applicable to a situation where the operation schedule of the motor drive involves repeated runs of high speed, such as base speed, or higher. A traction drive operates normally under such conditions, since it experiences regular acceleration-cruise-braking cycles. Assuming such a situation, the torque is determined from power measurements effected during high speed runs, that is, when the determination of the torque from the knowledge of the power is acceptable. The results of such determination are used to effect a recalibration of the value of $R_2$, and such recalibration is used to obtain the torque according to FIG. 5, as explained heretofore.

The concept of using power measurements for determining the torque has been proposed before. Referring to FIG. 1, it can be shown that the "air-gap power", i.e. the power supplied by voltage $E_1$ to the rotor via current $I_2$, is proportional to the product $(T\omega_1)$ namely of the torque by the stator angular frequency. Neglecting stator copper losses and core losses, it can be said that the stator power is proportional to $(T\omega_1)$. Further, neglecting inverter losses, the dc link power itself can be considered proportional to $(T\omega_1)$. Let $W_d$ be the dc link power. The latter is defined by:

$$W_d = V_d I_d$$

with the notations of FIG. 6. Within the stated approximations, namely ignoring the losses, the relationship to the torque becomes:

$$W_d = (T\omega_1)/p$$

for a motor having 2p poles. Therefore the torque can be determined by the equation:

$$T = p V_d I_d / \omega_1 \tag{16}$$

wherein $V_d$ and $I_d$ are measurable external quantities and $\omega_1$ is a known quantity impressed on the motor by the inverter as a command signal (line 33 in FIG. 7).

Equation (16) suggests a torque estimation method known in the prior art. This method, however, has its drawbacks, which hinder its use at low speeds. At such speeds, the measured power term $V_d I_d$ can be quite small, to the extent that the neglected loss terms are not negligible at all, and they can even represent the dominant component of the power supplied by the dc link. Unless the losses can be accurately predicted, a torque estimation method based on dc link power measurements is not valid at low speed. This is a known problem with this approach.

At high speed, however, the mechanical power delivered to the shaft is high for any sizable value of the torque. This means that the error introduced by ignoring the losses is now relatively small and relation (16) holds with good approximation. Other considerations that lead to recognizing the validity of equation (16) at high speeds are as follows:

In PWM drives, all modulation usually ceases at high speed and the motor voltage becomes an unnotched square wave. This reduces the switching losses in the inverter as well as the harmonic losses in the motor, making it more acceptable to neglect these losses.

Above base speed, the motor enters the "field weakening" mode, as the excitation level becomes lower than rated. Since the core losses drop as the square of the excitation current, there is a net core loss reduction despite the increased fundamental frequency. This adds to the justification of disregarding the losses.

At high speed, the required torque levels are often much lower than rated, resulting in lower values of stator current, thus, lower copper losses and lower conduction losses in the inverter. This is a further reason for ignoring these losses.

In a traction drive, all such favorable conditions happen to co-exist when cruising at high speed. The present invention takes advantage of the fact that a power-based torque estimation procedure can be implemented under such favorable conditions, and proposes to use power-based torque estimation for the determination the deviation $\Delta R_2$ of the rotor resistance from the room temperature value $R_2(c)$.

Figure 9:
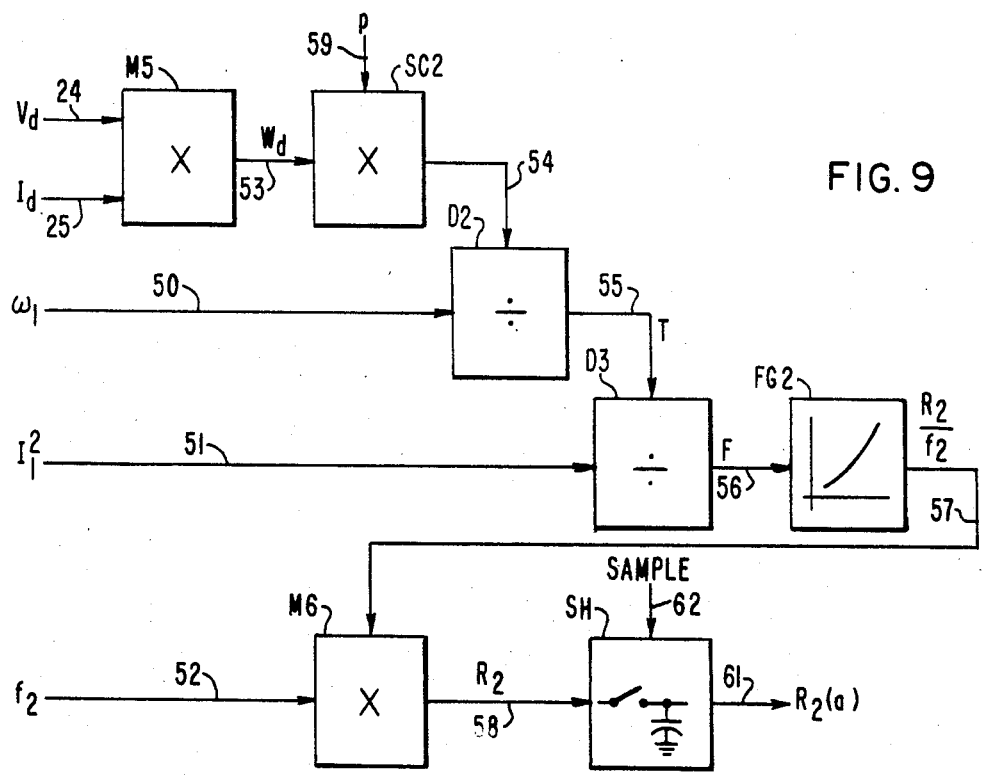
FIG. 9 is a block diagram illustrating the algorithm used for the determination of the rotor resistance while using DC link power measurement at high speed.

This procedure starts by sampling the dc link current value $I_d$ and the dc link voltage $V_d$ derived from lines 24, 25 in FIG. 6. Simultaneously, the stator angular frequency $\omega_1$ and the slip frequency $f_2$ are recorded. FIG. 9, is a functional block diagram representing an algorithm as can best be used by a microcomputer.

Referring to FIG. 9, signals $V_d$ of line 24 and $I_d$ of line 25 are inputted into multiplier M5 generating on line 53 the power representative signal $w_d$. In accordance with equation (16) the signal of line 53 is scaled (by scaler SC2 having the scaling factor p inputted on line 59) to provide on line 54 the numerator of the fraction of equation (16). Divider D2 responsive to $\omega_1$ on line 50 and to the signal of line 54, generates the torque value T on line 55.

Returning to equation (10) $(T = I_1^2 F)$, FIG. 9 represents the implementation in reverse to derive the value of $R_2$. $I_1^2$ is derived on line 51 from line 9 in FIG. 5 and divider D3 combines T on line 55 with $I_1^2$ on line 51 to provide F on line 56.

F is a function of the ratio $R_2/\omega_2 = R_2/2\pi f_2$ as stated in equation (11). Equation (11) can be written by recombination so that $R_2/F_2$ be expressed as a function of F, F being the variable, as follows: $R_2/f_2 = f^*(F)$.

Figure 10:
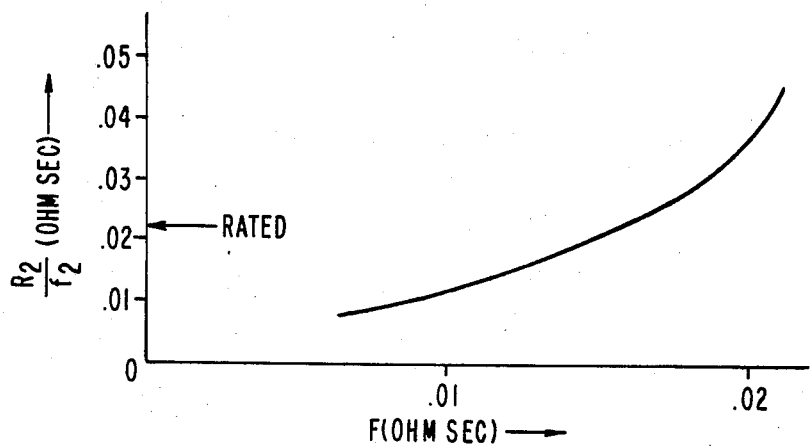
FIG. 10 illustrates the function $R_2/f_2$ of F as can be used in accordance with FIGS. 7 to 9.

This mathematical transformation cannot be achieved algebraically since solving equation (11) involves solving an equation of the 4th degree. However, for a give motor, it can be done numerically. FIG. 10 is a curve obtained for the particular motor of Table I. It represents $R_2/f_2$ in ohm/sec as a function of F also in ohm/sec, e.g. each value of F for each value of $R_2/f_2$.

A function generator FG2 in FIG. 9 duplicates the values of the curve of FIG. 10. In this regard, a look-up table, typically having $2^7$, or $2^8$ locations, is addressed by the digitized value of F, when it is quantized in $2^7$, or $2^8$ discrete levels through the entire useful range. At each location so addressed is stored the corresponding value of $R_2/f_2$ taken from the curve of FIG. 10. $f_2$ is supplied by line 52 and line 10 of FIG. 5. Multiplier M6 responds to $f_2$ on line 52 and to $R_2/f_2$ on line 57 from FG2. Accordingly, $R_2$ is derived on line 58. A sample and hold circuit SH strobes under command on line 62 the values of line 58 and outputs on line 61 the compensated value $R_2(a)$: This is the correct the value applied on line 12 to divider D1 of FIG. 5.

The value stored by sample and hold circuit SH is retained until subsequent opportunity occurs of doing another recalibration, thereby updating $R_2(a)$. For thermal compensation, the actual value $R_2(a)$ is applied on line 12 to divider D1 of FIG. 5, instead of the presumed value $R_2(p)$, thereby recalibrating the system against thermal drift of $R_2$.

Figure 11:
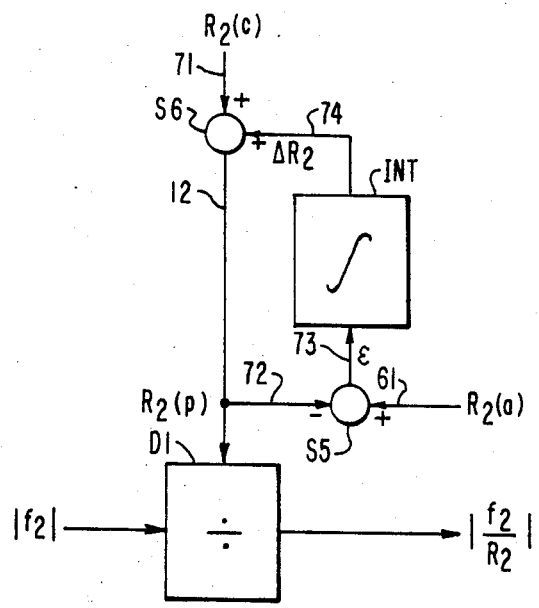
FIG. 11 is a block diagram illustrating the use of an integrator loop within the current of FIG. 8.

Referring to FIG. 11, another scheme for recalibrating $R_2$ is shown, using an integrator, rather than a sample and hold approach. The presumed value $R_2(p)$ is applied on line 12 to the divider D1 of FIG. 5. The value of line 12 is derived on line 72 and applied to a summer S5 responsive to $R_2(a)$ of line 61, thereby providing an error on line 73 to integrator INT. The integrated value outputted on line 74, is added as $\Delta R_2$ to the cold value $R_2(c)$ of line 71 by a summer S6, thereby adjusting the presumed value of line 12.

To summarize: The present invention rests on one or on a combination of the following concepts;

The concept of deriving torque information as a function of stator current and slip frequency only, by applying equation (10) in a basic torque estimation method via arithmetic operations and look-up tables, as explained in relation to FIG. 5;

The concept of compensating for the effects of the thermal drift of rotor resistance $R_2$ by sensing the stator temperature and predicting the rotor temperature via a chosen and empirical relation between such temperatures.

The concept of compensating for the effects of the thermal drift of rotor resistance $R_2$, consisting of: performing DC link power measurements in selected favorable conditions at high speed, separately deriving from such measurements an auxiliary torque signal, using such signal to compute the actual value of $R_2$ via equation (10) on the basis of value of $R_2$ stored in a look-up table, and using the computed actual value of $R_2$ to recalibrate the basic torque estimation method.

I claim:

1. Apparatus for the determination of the torque of a rotating induction motor including p pairs of poles, having a rotor leakage inductance $L_2$, a magnetizing inductance $L_M$ and a rotor resistance $R_2$, comprising:

first sensing means for deriving a first signal representative of the stator current $I_1$;

second sensing means for deriving a second signal representative of the slip angular frequency $\omega_2$ of the motor;

first combining means responsive to said first signal for providing a third signal representative of $I_1^2$; and second combining means responsive to said second signal and to said third signal for deriving a signal representative of the instantaneous torque T in accordance with the formula:

$$T = 3pI_1^2(R_2/\omega_2)\frac{(R_2/\omega_2)^2 + L_2^2}{[(R_2/\omega_2)^2/L_M + L_2(1 + L_2/L_M)]^2 + (R_2/\omega_2)^2}.$$

2. The apparatus of claim 1, with said first and second signals being converted into digital signals, respectively;

with computer means being provided including said first and second combining means; said second combining means including a look-up table having stored data representing the function:

$$F = 3p(R_2/\omega_2)\frac{(R_2/\omega_2)^2 + L_2^2}{[(R_2/\omega_2)^2/L_M + L_2(1 + L_2/L_M)]^2 + (R_2/\omega_2)^2};$$

said computer means providing with said second digital signal an address signal representing $(R_2/\omega_2)$ and addressing said look-up table in response thereto to provide a fourth signal representative of F;

said computer means providing said third signal representative of $I_1^2$ in response to said first signal and combining said third signal with said fourth signal in accordance with the relation $T = I_1^2 \times F$ to provide a fifth signal representative of the instantaneous torque T of the motor.

3. Apparatus for the determination of the torque of a rotating induction motor including p pairs of poles, having a rotor leakage inductance $L_2$, a magnetizing inductance $L_M$ and a rotor resistance $R_2$, comprising:

first sensing means for deriving a first signal representative of the stator current $I_1$;

second sensing means for deriving a second signal representative of the slip angular frequency $\omega_2$ of the motor;

with said first and second signals being converted into digital signals, respectively;

with computer means being provided including a first look-up table having stored data representing the function:

$$F = 3p(R_2/\omega_2)\frac{(R_2/\omega_2)^2 + L_2^2}{[(R_2/\omega_2)^2/L_M + L_2(1 + L_2/L_M)]^2 + (R_2/\omega_2)^2};$$

said computer means providing with said second digital signal an address signal representing $(R_2/\omega_2)$ and addressing said first look-up table in response thereto to provide a third signal representative of F;

said computer means providing a fourth signal representative of $I_1^2$ in response to said first signal and combining said third signal with said fourth signal in accordance with the relation $T = I_1^2 \times F$ to provide a fifth signal representative of the instantaneous torque T of the motor;

the apparatus being combined with a system for automatically correcting said fifth signal derived from the apparatus, the system comprising:

means for storing in said computer means the value of $R_2$ under initial conditions of temperature and with the motor idle;

means for measuring the temperature of the stator when the motor is running to derive a signal represenaitve of a temperature change upward from said initial conditions;

means in said computer means for deriving with said temperature change representative signal a sixth signal indicative of a corresponding change in the rotor resistance $R_2$;

said computer means applying said sixth signal as a corrective signal to said address signal $(R_2/\omega_2)$.

4. The system of claim 3, with said sixth signal being derived from said temperature change representative signal by calculating $\Delta R_1/R_1(c)$, where $\Delta R_1$ is a change in the stator resistance $R_1(c)$ under said initial conditions of temperature, when the temperature change in the rotor is $\Delta T_s$.

5. The system of claim 4, with said sixth signal being scaled by a value representing $R_2(c)$ the rotor resistance for said initial conditions of temperature.

6. The system of claim 4, with said sixth signal being scaled by a value representing $k[R_2(c)]^2/R_1(c)$, where $R_2(c)$ and $R_1(c)$ are the rotor and stator resistances, respectively, for said initial conditions of temperature, and k is a coefficient of proportionality.

7. Apparatus for the determination of the torque of a rotating induction motor including p pairs of poles, having a rotor leakage inductance $L_2$, a magnetizing inductance $L_M$ and a rotor resistance $R_2$, comprising:

first sensing means for deriving a first signal representative of the stator current $I_1$;

second sensing means for deriving a second signal representative of the slip angular frequency $\omega_2$ of the motor;

with said first and second signals being converted into digital signals, respectively;

with computer means being provided including a first look-up table having stored data representing the function:

$$F = 3p(R_2/\omega_2) \frac{(R_2/\omega_2)^2 + L_2^2}{[(R_2/\omega_2)^2/L_M + L_2(1 + L_2/L_M)]^2 + (R_2/\omega_2)^2};$$

said computer means providing with said second digital signal an address signal representing $(R_2/\omega_2)$ and addressing said first look-up table in response thereto to provide a third signal representative of F;

said computer means providing a fourth signal representative of $I_1^2$ in response to said first signal and combining said third signal with said fourth signal in accordance with the relation $T = I_1^2 \times F$ to provide a fifth signal representative of the instantaneous torque T of the motor;

the apparatus being combined with a system for automatically calibrating the apparatus whenever the motor is running at least at rated speed, the system comprising:

means for sensing the power $W_d$ of the motor, the frequency $\omega_1$ of the stator current to derive a power signal and a stator frequency signal, respectively;

said computer means calculating the correct torque $T_c$ with the function:

$$p \times W_d/\omega_1 = T_c;$$

by combining said power signal and said stator frequency signal to derive a signal representative of the correct torque $T_c$;

said computer means including a second look-up table based on the function:

$$R_2/\omega_2 = f^*(F)$$

where $f^*(F)$ is the inverse function of said function F;

said computer means addressing said second look-up table with a signal representative of said calculated value $T_c$, thereby to derive a recalibrated value $R_2(a)$ based on said signal $\omega_2$ and said value $T_c$;

said apparatus deriving at speeds less than rated speed said recalibrated value $R_2(a)$ as an address combined with said $\omega_2$ signal for addressing said first look-up table.

8. The system of claim 7 with said recalibrated value $R_2(a)$ being derived recurrently when the motor is running at least at rated speed, a new recalibrated value being combined with a preceding recalibrated value by an integrator to form said first look-up table address.

9. The apparatus of claim 1, with said motor being supplied from an inverter coupled to a DC voltage source, the inverter being controlled in relation to the frequency of the stator current for adjusting the speed of the motor;

a torque controller being provided for adjusting the frequency of the stator in relation to said torque T representative signal and a torque reference signal.

* * * * *